United States Patent [19]

Duncan

[11] Patent Number: 5,583,186

[45] Date of Patent: Dec. 10, 1996

[54] PROCESS FOR THE PRODUCTION OF POLYBUTENE AMINES

[75] Inventor: Michael P. Duncan, Schererville, Ind.

[73] Assignee: Ferro Corporation, Cleveland, Ohio

[21] Appl. No.: 457,521

[22] Filed: Jun. 1, 1995

[51] Int. Cl.$^6$ ...................................................... C08F 8/32
[52] U.S. Cl. .................. 525/368; 525/334.1; 525/369; 525/379
[58] Field of Search .................................. 525/368, 369, 525/379

[56] References Cited

U.S. PATENT DOCUMENTS

| | | | |
|---|---|---|---|
| 3,454,555 | 7/1969 | van der Voort et al. | 260/239 |
| 3,671,511 | 6/1972 | Honnen et al. | 260/93.7 |
| 5,346,965 | 9/1994 | Dever et al. | 525/379 |

Primary Examiner—Bernard Lipman
Attorney, Agent, or Firm—Rankin, Hill, Lewis & Clark

[57] ABSTRACT

The present invention provides a new and improved process for preparing a polybutene amine composition comprising the steps of reacting a chlorinated polybutene with an excess of at least one mole of at least one type of an amine compound per mole of the chlorinated polybutene at a reaction temperature of at least about 100° C.; neutralizing the reaction mixture with calcium oxide; and recovering the polybutene amine composition, the recovery process including the steps of removing the formed water and the neutralized and excess of the amine compound and removing inorganic solids using a non-aqueous separation technique such as filtration. During the neutralization step, water formation is kept to a minimum and no water is intentionally added to the process thereby minimizing resultant waste streams and/or undesirable by-products.

17 Claims, No Drawings

PROCESS FOR THE PRODUCTION OF POLYBUTENE AMINES

TECHNICAL FIELD

The present invention relates to a process of producing polybutene amines. More particularly, it relates to a process of producing polybutene amines using calcium oxide (CaO).

BACKGROUND ART

Deposit-control fuel additives effectively control deposits in carburetors, valves and fuel injectors of engine intake systems. Aminated polybutenes are widely employed as deposit control fuel additives. Aminated polybutenes are produced commercially by one of three prior art processes which involve the reaction of chlorinated polybutene with an amine compound to produce a polybutene amine. These prior art processes, however, are characterized by the separation of undesirable side products, the creation of a large volume of contaminated aqueous waste streams and the requirement to remove alcohols or ammonia from the excess amine reactant.

U.S. Pat. No. 3,671,511, represents one of the primary processes employed to produce polybutene amines today. It involves the reaction of chlorinated polybutene with an excess of polyamine, stripping the excess amine under vacuum, adding aromatic solvent to dilute the reaction mixture, and neutralizing the reaction mixture with aqueous sodium hydroxide. This step forms an emulsion which is broken by adding butanol. The phases are separated and the organic layer is washed several times using water, stripped of butanol and dried, then diluted with the desired solvent. This process has many potential disadvantages. One mole of excess amine per mole of reacted chlorinated polybutene is not recovered during neutralization and ultimately is discarded in an aqueous salt solution. This results in the loss of a valuable raw material. The large volume of aqueous waste stream generated contains salt, amine, traces of aromatic solvent and butanol. This waste stream represents a potential disposal problem. The butanol adds to the cost of the process since it cannot be totally recovered, and the necessity of performing multiple washes increases cycle time and manufacturing costs.

U.S. Pat. No. 3,454,555 describes another frequently used process to prepare polybutene amines and describes a system which overcomes many process-related problems associated with aqueous separation/water washing, the use of butanol and the loss of neutralized amine. It has a different potential problem, however, which can render its product unacceptable to the customer. This process involves the reaction of an excess of polyamine with a chlorinated polybutene in the presence of sodium carbonate. When the reaction is completed, the excess amine and water of neutralization are removed by vacuum stripping, the reaction mixture is diluted with solvent and filtered to remove inorganic salts, and the product is then stripped of excess solvent to the desired basic nitrogen level. The potential disadvantages of this process are that: (1) the carbon dioxide produced as a by-product reacts with the excess amine and the product to produce other by-products; and 2) the excess amine and water require further processing (separation) in order to reuse/recycle the excess amine. The above noted by-products are insoluble in the product and, with time, precipitate out to form a solid phase which creates many problems for the customer. Removal of this solid phase adds substantial cost.

U.S. Pat. No. 5,346,965 describes another process used to produce polybutene amines. This process avoids the problems of aqueous waste streams and undesirable side-products left in the product. This process utilizes an alkali metal, an alkaline earth metal alkoxide or an amide to neutralize the amine hydrochloride which forms as a by-product. A potential disadvantage of this process is that highly reactive and potentially hazardous alkali metals, alkaline earth metal alkoxides or amides have to be used, and volatile and flammable alcohols or ammonia which are formed during the process have to be removed from the excess amine reactant and product.

SUMMARY OF THE INVENTION

The present invention provides a process for the production of polybutene amine fuel additives from chlorinated polybutenes which avoids undesirable side reactions, hazardous neutralizing agents and difficult to handle waste streams.

The present invention also provides a process for the manufacture of polybutene amine fuel additives wherein substantially all of the excess amine may be recovered without the addition of water (and with the generation of a minimal amount of water during neutralization) for removing metal salts (i.e., NaCl, KCl, $CaCl_2$, etc.) from the reaction mixture. The present invention also provides a process for the manufacture of polybutene amine fuel additives which does not require the use of butanol or other emulsion-breaking additives.

The process of the present invention provides a process for preparing a polybutene amine composition comprising the steps of: (i) reacting a chlorinated polybutene with an excess of at least one mole of at least one type of an amine compound per mole of the chlorinated polybutene at a reaction temperature of at least about 100° C. with the formation of amine hydrochloride; (ii) neutralizing the reaction mixture with lime comprising at least 85% by weight calcium oxide (CaO) with the formation of water; (iii) removing the water and excess of the amine compound; (iv) removing the reacted calcium oxide; and (v) recovering the polybutene amine additive using a non-aqueous separation technique such as filtration. Preferably, substantially no water is intentionally added to the process either during or prior to the non-aqueous separation step.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

PREFERRED EMBODIMENTS OF THE INVENTION

The present invention is directed toward the manufacture of polybutene amine fuel additives without the undesired by-products, hazardous neutralizing agents or difficult to handle waste streams or environmental disadvantages associated with some prior art processes.

The objects of the invention have been accomplished through a process for the manufacture of polybutene amine fuel additives which comprises the general steps of reacting chlorinated polybutene with an excess of amine; neutralizing the reaction mixture with lime comprising at least 85% by weight calcium oxide with the formation of water; removing the water and the excess of the amine compound; removing the reacted calcium oxide as calcium chloride and calcium hydroxide; and recovering the polybutene amine fuel additive composition.

Recovery is conducted by cooling and adding a small amount of aromatic solvent to improve viscosity, using a non-aqueous separation technique such as filtering on the reaction mass so as to remove inorganics, and diluting the final product with an aromatic solvent to the desired percent basic nitrogen.

Chlorinated polybutenes are prepared by chlorinating commercially available polybutenes. The number average molecular weight of the commercial polybutenes is generally greater than about 400, preferably from about 400 to about 3,000, more preferably from about 600 to about 2,200, and most preferably from about 800 to about 1,600. Notwithstanding the foregoing ranges and values, it is to be understood that practice of the present invention is possible with any chlorinated polybutene, prepared from any commercially available polybutene, having any number average molecular weight between about 400 and 3000. Chlorinated polybutenes are available commercially from various sources including the assignee of the present invention, the Ferro Corporation of Cleveland, Ohio. U.S. Pat. No. 3,671,511 is incorporated herein by reference for its teachings regarding the production of chlorinated polybutenes.

Typical useful polybutenes that are commercially available today include, for example, Indopol® H300 (Mn 1300) from Amoco; Parapol® 950 (Mn 950) or Parapol® 1300 (Mn 1300) both from Exxon; Napvis® 30 (Mn 1300) or Ultravis® 10 (Mn 950) both from British Petroleum and Glissopal® ES 3250 (Mn 1000) from BASF.

The amine compound can be a primary amine or a secondary amine compound, so long as the reacting amine group is not a tertiary, and more specifically can be a monoamine, a diamine, or a polyamine (that is 3 or more amine groups). The amine compounds useful in preparing the polybutene amine compounds of the present invention are various monoamines, diamines, and polyamines such as cyclic diamines and polyamines, and alkylene diamines and polyamines of the formula:

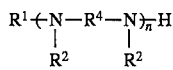

and cyclic monoamines and monoamines of the formula:

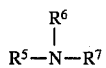

wherein each of $R^1$, $R^2$, $R^3$, $R^4$, $R^5$, $R^6$, and $R^7$, independently, is a hydrogen atom or a hydrocarbyl radical containing from 2 to about 40 carbon atoms, provided, however, that at least one of $R^5$, $R^6$ and $R^7$ is hydrogen, $R^4$ is a divalent hydrocarbon radical containing from 1 to about 18 carbon atoms and n is an integer from 1 to about 10. Generally these hydrocarbyl radicals are aliphatic radicals free from unsaturation and contain from 1 to about 10 carbon atoms. Examples of such various amine compounds include ethylene polyamines, butylene polyamines, propylene polyamines, pentylene polyamines and the like, cyclic polyamines such as piperazines and N-aminoalkyl substituted piperazines, and the like. Specific non-limiting representative examples of such polyamines also include ethylenediamine, diethylenetriamine, triethylenetetramine, tris-(2-aminoethyl)-amine, propylenediamine, trimethylenediamine, tripropylamine-tetramine, tetraethylenepentamine, and heptaethylenehexamine.

Among the monoamines useful in this invention are those of the formula $HNR^8R^9$ wherein $R^8$ is an alkyl radical of up to 10 carbon atoms and $R^9$ is a hydrogen atom or an alkyl radical of up to 10 carbon atoms. Examples of suitable monoamines are ethylamine, diethylamine, n-butylamine, di-n-butylamine, allylamine, isobutylamine, cocoamine, stearylamine, oleylamine, laurylamine, and methyllaurylamine.

Cyclic monoamines are also useful in making the compositions of this invention. The cyclic ring can be substituted with hydrocarbyl radicals such as alkyl or alkenyl. In addition, the ring can also contain other nitrogen atoms including those not having hydrogen atoms bonded to them. Generally, these rings have 3 to 10, preferably 5 or 6 ring members. Among such cyclic monoamines are aziridines, azetidines, pyrrolidines, and piperidines.

Examples of preferred amine compounds include octylamine, nonylamine, decylamine, dodecylamine, ethylenediamine, propylenediamine, N,N-dimethylaminopropylamine, diethylenetriamine, triethylene tetramine, and the like with ethylenediamine, N,N-dimethylamino-propylamine, and diethylenetriamine being preferred. Inasmuch as a compound high in basic nitrogen is desired, diamines and polyamines are preferred.

The amine compounds of the present invention may also contain one or more hydroxyl groups and, therefore, may include the hydroxymonoamines, hydroxydiamines, hydroxpolyamines, dihydroxymonoamines, dihydroxydiamines, dihydroxypolyamines, polyhydroxymonoamines, polyhydroxydiamines, or polyhydroxypolyamines, or combinations thereof, or combinations of amines containing one or more hydroxyl groups with one or more the of the various monoamines, diamines, and polyamines described hereinabove. In addition to the hydroxyl groups, the amine compounds of the present invention may alternatively contain any other substituent group so long as the latter does not interfere with the amination. Typically such groups include esters, ethers, amides, imides, aryls and the like.

The hydroxyl-group-containing amines of the present invention include those compounds where hydroxyl radicals replace one or more hydrogen radicals attached to carbon atoms of the various hydrocarbyl radicals, alkyl radicals, or divalent hydrocarbon radicals of the various monoamine, diamine, and polyamine structures described hereinabove.

Examples of the hydroxyl-group-containing amines useful in this invention include aminoethylethanolamine, diaminopropanol, bis-(2-hydroxyethyl)ethylene-diamine, aminohexanol, aminopentanol, and aminobutanol, and the like, with aminoethylethanolamine, diaminopropanol, and bis-(2-hydroxyethyl)ethylene-diamine being preferred. Inasmuch as a compound high in basic nitrogen is desired, compounds containing more than one amine group are generally preferred.

It is an important aspect of the present invention to utilize an excess of the amine compound. The excess of amine compound is generally greater than about 1 mole excess amine per mole of chlorinated polybutene, generally from about 1 to about 10 moles excess amine per mole of chlorinated polybutene, preferably from about 3 to about 5 moles excess amine per mole of chlorinated polybutene. Because the process of the present invention allows for the recovery of the amine reactant, use of an excess amount is not of concern.

The reaction of chlorinated polybutene with excess amine must be carried out at an elevated temperature which is generally dependant upon the boiling point of the amine. Accordingly, the reaction temperature is generally at least 100° C., preferably from about 100° C. to about 220° C., more preferably from about 140° C. to about 170° C. Reaction times vary between from about 2 to about 10 hours with 3 to 6 hours being preferred. Where the boiling point of the amine selected is lower than the foregoing temperature range, the reaction can be run under the necessary pressure to develop the temperature without loss of the amine. Otherwise, pressure is not a condition for practice of the present invention.

The present invention does not preclude the use of inert organic solvents. Such solvents include aromatic solvents having a total of from about 6 to about 9 carbon atoms with specific examples including xylene, toluene, $C_9$ aromatic, and the like; an aliphatic solvent having from about 6 to about 10 carbon atoms with specific examples including isooctane, heptane, cyclohexane, and the like, or various aliphatic substituted aromatic compounds, and the like, as well as combinations thereof. However, it is preferred that no solvent is added to the process until after the step of removing the formed water and of amine (excess and neutralized).

When the reaction between the chlorinated polybutene and excess amine is completed, amine hydrochloride is formed in the reaction mixture. This amine hydrochloride must be neutralized. Thus, when the reaction between the chlorinated polybutene and excess of amine is completed, the excess amine is removed and the reaction mixture is then neutralized through the addition of lime (calcium oxide (CaO)) at the reaction temperature, or the reaction mixture may be cooled before the addition of the lime. The removal of the excess amine is important in order to avoid foaming problems during the water and neutralized amine removal steps.

Prior to neutralization, the reaction mixture is generally not cooled so as to reduce the reaction time. Upon the addition of the lime, calcium chloride and calcium hydroxide are formed and a small amount of water and neutralized amine are also formed. The water and neutralized amine which results are removed by distillation along with any solvent that may have been introduced into the reaction mixture.

As used in this specification and the claims below, the term "lime" is to be afforded a broad interpretation. Specifically, the term lime is intended to encompass a broad range of calcium oxide containing commercial products including quick lime, hydraulic lime, burnt lime, calx, slaked and unslaked lime and hydrated lime. In addition to calcium oxide, commercially available lime may contain calcium hydroxide ($Ca(OH)_2$), calcium carbonate, iron and aluminum oxides, and other materials.

A sufficient amount of calcium oxide is utilized to assure complete neutralization and dehydration of the resulting mixture. In order to minimize the amount of water formed, preferably at least 0.55 moles, more preferably at least 0.65 moles, and most preferably at least 0.85 moles of calcium oxide are used for every mole of formed amine hydrochloride. Also, in order to minimize the amount of water formed, the lime prior to its use is kept as dry as possible so as to avoid the formation of calcium hydroxide. When exposed to moisture, lime readily reacts with water or moisture to form calcium hydroxide. Preferably, the lime used comprises at least 85% by weight, more preferably at least 90% by weight, and most preferably at least 95% by weight calcium oxide.

During or after the lime addition, the reaction temperature is generally increased to a temperature between about 100° C. and about 200° C., preferably about 140° C. to about 170° C. Again, the specific temperature accompanying this stage of the process is amine dependent. The neutralization reaction is generally complete after 1 to 2 hours.

In any instance, water is produced as a by-product. The water then reacts with the remaining calcium oxide to form calcium hydroxide (dehydration). Calcium chloride ($CaCl_2$) is also formed as a by-product during neutralization. For example, the reaction of an amine hydrochloride ($R$—$NH_3Cl$) and calcium oxide ($CaO$) is as follows:

Neutralization: $CaO + 2R$—$NH_3Cl = CaCl_2 + 2R$—$NH_2 + H_2O$

Dehydration: $CaO + H_2O = Ca(OH)_2$

Resulting Reaction: $2CaO + 2R$—$NH_3Cl = CaCl_2 + 2R$—$NH_2 + Ca(OH)_2$

During the neutralization reaction, the water that remains after dehydration and any solvent that may be introduced into the reaction mixture with the added calcium oxide neutralizing agent is concurrently removed with any remaining excess amine (if the excess amine is not removed after amination) and neutralized amine hydrochloride (free amine). The neutralization reaction is typically operated at pressurized conditions (i.e., about 10 psi). After the neutralization reaction is complete, the reaction mixture is maintained at between 100° C. to about 200° C., preferably about 120° C. to about 160° C., the specific temperature being amine dependent.

The present invention provides a process for the manufacture of polybutene amine fuel additives wherein substantially all of the excess amine, a valuable reactant, can be recovered from the reaction mixture by sparging with nitrogen, atmospheric distillation or by vacuum stripping. Generally speaking, the temperature and pressures to be employed are related to the amine selected. For example, in the instance of aminoethylethanolamine, the vacuum stripping step is generally conducted at gradually increasing temperatures between 50° C. and 230° C., preferably 140° C. to 210° C., more preferably 170° C. to 200° C., and most preferably to a final temperature of about 200° C. Ultimate vacuum conditions are generally from about 20 mm to 10 mm Hg. The reaction mixture is generally held at temperature and vacuum for at least about 15 minutes, and preferably at least about 20 minutes to ensure the removal of water and free amine.

Recovery of the amine following amination of the chlorinated polybutene is not limited to following the step of reacting, or neutralizing. For instance, it is within the scope of the present invention to conduct a partial strip or complete strip of the excess amine prior to reaction (neutralization) with lime. Thus, as used herein, unless otherwise indicated the recitation regarding removal of excess amine compound shall not be limited to removal following reaction with lime but shall also include recovery at other stages of the process, including incremental steps.

In either instance, following recovery of substantially all of the amine (excess and neutralized amine hydrochloride) the polybutene amine fuel additive is separated from the calcium chloride and calcium hydroxide which resulted from the neutralization reaction. A number of acceptable non-aqueous separation techniques exist (i.e. non-mechanical techniques such as decantation and mechanical techniques such as centrifuge, plate and frame, pressure leaf, rotary vacuum, etc.). The preferred nonaqueous separation technique is plate and frame filtration. The filter cake that is produced in the filter is primarily calcium chloride and calcium hydroxide. The filter cake material may be washed with a small amount of solvent, preferably C9 aromatic solvent, toluene or a polyether, and then dried for disposal.

The polybutene amine final product that is generated by the process may be diluted with solvent, preferably C9 aromatic solvent or toluene, to the desired percent basic nitrogen. The solvent used to wash the filter cake may also be used in this dilution. The percent basic nitrogen in the final product is generally greater than 0.4 percent, preferably greater than 1 percent, and usually about 0.9 percent to 1.3 percent.

In order to demonstrate practice of the present invention, the following illustrative examples are provided. The specific embodiments described below are intended to illustrate, but not to limit, the present invention.

EXAMPLE NO. 1

A mixture of 682.1 g chlorinated Exxon Parapol® 1300 polybutene (containing 3.1 percent by weight chlorine or 0.6 mole equivalent of chlorine) and 120.2 g (2.0 mole) of ethylenediamine (EDA) was heated to 150°–160° C. with stirring in a 1-liter glass reactor equipped with a pressure and vacuum gauge, a thermometer, a venting valve with attached water condenser and receiver, a nitrogen inlet with sparge tube, a vacuum pump, and a mechanical stirrer. The reaction mixture was heated for 4 hours at 150°–160° C. and 15–25 psi pressure.

The pressurized sealed reactor was vented to atmospheric pressure thru the condenser to a receiver at 150°–160° C. to remove the excess EDA from the reaction mixture. After reaching atmospheric pressure, vacuum (26–28 inches of Hg) was applied for 30 minutes at 140°–150° C. to remove the majority of excess amine. The vacuum pump was then stopped and the reactor returned to atmospheric pressure using nitrogen. A total of 69.3 g of EDA was recovered during the atmospheric and vacuum stripping operations.

The mixture was maintained at 140°–150° C., then 28.0g (0.5 mole) of pulverized lime (containing 95% by weight calcium oxide) was added to the reactor in one portion. Immediately after the lime addition, the reactor was sealed and the temperature maintained at 150°–160° C. for 2 hours. During the neutralization period, the reactor pressure rose to 10–15 psig.

After the 2 hour neutralization period, the reactor was vented through the condenser to a receiver at 150°–160° C. to remove the neutralized EDA.HCl (free EDA) and traces of water. After reaching atmospheric pressure, the reactor was placed under vacuum (26–28 inches of Hg) at 150°–160° C. for 2 hours to remove the final traces of EDA and water. The vacuum pump was then stopped and the reactor returned to atmospheric pressure using nitrogen. A total of 25.7g of EDA/H$_2$O (99% EDA) was recovered during the atmospheric and vacuum stripping operations.

The mixture was then cooled to 140° C., then 230.7 g of Exxon A-150 solvent was added and mixed. The solvent diluted mixture was then vacuum filtered through a 20–25 micron paper filter at 85°–95° C. After filtration, 922.8 g of diluted product (25% by weight solvent, 75% by weight product) was collected as a yellowish orange colored liquid, which analyzed to give 0.96% basic nitrogen, 0.50% chlorine, 0.006% water-soluble amine (free EDA), and 26 ppm calcium.

EXAMPLE NO. 2

A mixture of 354.6 g chlorinated Amoco H-100H polybutene (containing 6.0% by weight chlorine or 0.6 mole of chlorine) and 120.2 g (2.0 mole) of EDA was heated to 150°–160° C. with stirring in a sealed 1 liter glass pressure reactor equipped with a pressure and vacuum gauge, thermometer, venting valve with attached water condenser and receiver, a nitrogen inlet with sparge tube, a vacuum pump and a mechanical stirrer. The reaction mixture was held at 150°–160° C. and 25–35 psig pressure for 4 hours.

The pressurized sealed reactor was vented to atmospheric pressure thru the condenser to a receiver at 150°–160° C. to remove the excess EDA from the reaction mixture. After reaching atmospheric pressure, vacuum (26–28 inches of Hg) was applied for 30 minutes at 140°–150° C. to remove the majority of excess amine. The vacuum pump was then stopped and the reactor returned to atmospheric pressure using nitrogen. A total of 68.6 g of EDA was recovered during the atmospheric and vacuum stripping operations.

The mixture was maintained at 140°–150° C., then 28.0 g of pulverized lime (containing 95% by weight calcium oxide) was added to the reactor in one portion. Immediately after the lime addition, the reactor was sealed and the temperature maintained at 150°–160° C. for 2 hours. During the neutralization period, the reactor pressure rose to 10–15 psig.

After the 2 hour neutralization period, the reactor was vented through the condenser to a receiver at 150°–160° C. to remove the neutralized EDA.HCl (free EDA) and traces of water. After reaching atmospheric pressure, the reactor was placed under vacuum (26–28 inches of Hg) at 150°–160° C. for 2 hours to remove the final traces of EDA and water. The vacuum pump was then stopped and the reactor returned to atmospheric pressure using nitrogen. A total of 26.4 g of EDA/H$_2$O (99% EDA) was recovered during the atmospheric and vacuum stripping operations.

The mixture was then cooled to 140° C., then 156.4 g of C-9 aromatic solvent (Shell CYCLOSOL 53) was added and mixed. The solvent diluted mixture was then vacuum filtered through a 20–25 micron paper filter at 85°–95° C. After filtration, 521.1 g of diluted product (30% by weight solvent, 70% by weight product) was collected as a yellowish orange colored liquid, which analyzed to give 1.65% basic nitrogen, 1.00% chlorine, 0.015% water soluble amine (free EDA), and 19 ppm calcium.

EXAMPLE No. 3

A mixture of 322.2 g chlorinated Exxon Parapol® 450 polybutene (containing 13.2 percent by weight chlorine or 1.2 mole equivalent of chlorine) and 360.6 g (6.0 mole) of ethylenediamine (EDA) was heated to 150°–160° C. with stirring in a 1-liter glass reactor equipped with a pressure and vacuum gauge, a thermometer, a venting valve with attached water condenser and receiver, a nitrogen inlet with sparge tube, a vacuum pump and a mechanical stirrer. The reaction mixture was heated for 4 hours at 150°–160° C. and 25–35 psig pressure.

The pressurized sealed reactor was vented to atmospheric pressure thru the condenser to a receiver at 150°–160° C. to remove the excess EDA from the reaction mixture. After reaching atmospheric pressure, vacuum (26–28 inches of Hg) was applied for 30 minutes at 140°–150° C. to remove the majority of excess amine. The vacuum pump was then stopped and the reactor returned to atmospheric pressure using nitrogen. A total of 249.7 g of EDA was recovered during the atmospheric and vacuum stripping operations.

The mixture was maintained at 140°–150° C., then 56.1 g (1.0 mole) of pulverized lime (containing 95% by weight calcium oxide) was added to the reactor in one portion. Immediately after the lime addition, the reactor was sealed and the temperature maintained at 150°–160° C. for 2 hours. During the neutralization period, the reactor pressure rose to 10–15 psig.

After the 2 hour neutralization period, the reactor was vented through the condenser to a receiver at 150°–160° C. to remove the neutralized EDA.HCl (free EDA) and traces of water. After reaching atmospheric pressure, the reactor was placed under vacuum (26–28 inches of Hg) at 150°–160° C. for 2 hours to remove the final traces of EDA and water. The vacuum pump was then stopped and the reactor returned to atmospheric pressure using nitrogen. A total of 55.5 g of EDA/$H_2O$ (99% EDA) was recovered during the atmospheric and vacuum stripping operations.

The mixture was then cooled to 140° C., then 86.0 g of C-9 aromatic solvent (Shell CYCLOSOL 53) was added and mixed. The solvent diluted mixture was then vacuum filtered through a 20–25 micron paper filter at 85°–95° C. After filtration, 430.1 g of diluted product (25% by weight solvent, 75% by weight product) was collected as a yellowish orange colored liquid, which analyzed to give 4.14% basic nitrogen, 1.40% chlorine, 0.010% water-soluble amine (free EDA), and 38 ppm calcium.

As evident from the foregoing examples, the process of the present invention yields aminated polybutene products having a basic nitrogen content of greater than one percent by weight so that upon dilution, basic nitrogen in the reacted product will depend upon the particular amine, polybutene type and polybutene chlorine content employed. Dilution is a conventional step primarily for viscosity purposes which does not form part of the present invention. Dilution to a percent basic nitrogen of about one percent by weight is currently viewed by many end-users as an appropriate amount for use of a deposit control fuel additive. Nevertheless, it is to be appreciated that other dilutions, as well as the lack thereof are within the skill of the art, depending upon the intended use of the aminated product.

As is also to be appreciated by those skilled in the art, the present invention provides for the production of aminated polybutene deposit control additives for fuels. Detergents, pour point depressants, viscosity modifiers and the like developed for blending with fuels and oils are not effective as deposit control additives primarily because the molecular weight is different and/or because of the basic nitrogen content.

In similar fashion, it is to be appreciated that practice of the present invention is not limited to the specifics disclosed herein, the examples having been provided merely to enable those skilled in the art to have means by which to evaluate the present invention. Accordingly, it is well within the scope of this invention to vary the reaction conditions set forth herein as may be necessary to accommodate the reactants selected. Noncritical steps in the recovery of the product can be varied depending on the equipment employed as well as the preference of the operator.

Although the foregoing specification has been directed toward the amination of chlorinated polybutene, it should be understood that the step of neutralizing an amine hydrochloride with an excess of calcium oxide affords a general substantially anhydrous method of amine recovery. The process of amine recovery can also be employed independent of the polybutene amine process in those situations where a waste stream of amine hydrochloride in amine is produced. Furthermore, it is applicable to other amine salts that can be liberated to the free amine by reacting with calcium oxide, e.g., hydrosulfate salts of amines.

Based upon the foregoing disclosure, it should now be apparent that the process of the present invention will carry out the objects set forth hereinabove. It is, therefore, to be understood that any variations evident fall within the scope of the claimed invention and thus, the selection of specific reactants as well as processing conditions can be determined without departing from the spirit of the invention herein disclosed and described. In particular, deposit control fuel additives according to the present invention are not necessarily limited to those having the amines exemplified herein or the mole ratios employed. Moreover, as noted hereinabove, other reaction temperatures can be substituted for those disclosed herein. Thus, the scope of the invention shall include all modifications and variations that may fall within the scope of the following claims.

What is claimed is:

1. A process for preparing a polybutene amine composition comprising the steps of:

reacting a chlorinated polybutene with an excess of at least one mole of at least one type of an amine compound per mole of said chlorinated polybutene at a reaction temperature of at least about 100° C. with the formation of amine hydrochloride;

neutralizing the reaction mixture with lime comprising at least 85% by weight calcium oxide (CaO) with the formation of water, calcium hydroxide and calcium chloride;

recovering the polybutene amine composition without the use of water, said process including the steps of:

removing said formed water in a timely fashion;

removing the excess of said amine compound; and using a non-aqueous separation technique to separate the polybutene amine from said formed calcium hydroxide and said formed calcium chloride.

2. A process according to claim 1, wherein said reaction temperature is from about 100° C. to about 220° C., and wherein said excess of said amine is from about 1 mole to about 10 moles of said chlorinated polybutene.

3. A process according to claim 2, wherein said reaction temperature is from about 140° C. to about 170° C., and wherein said excess of said amine is from about 4 moles to about 8 moles of said chlorinated polybutene.

4. A process according to claim 3, wherein said reaction temperature is from about 170° C., and wherein said excess of said amine is from about 5 moles to about 7 moles of said chlorinated polybutene.

5. A process according to claim 1, wherein said amine compound is selected from the group consisting of primary and secondary monoamines, diamines and polyamines, hydroxymonoamines, hydroxydiamines, hydroxypolyamines, dihydroxymonoamines, dihydroxydiamines, dihydroxypolyamines, polyhydroxymonoamines, polyhydroxydiamines, polyhydroxypolyamines, and combinations thereof.

6. A process according to claim 5, wherein said amine compound is selected from the group consisting of dimethylaminopropylamine, diethylenetriamine, ethylenediamine, aminoethylethanolamine, diaminopropanol, or combinations thereof.

7. A process according to claim 1, wherein substantially all of the excess and neutralized amine is recovered.

8. A process according to claim 1, wherein said process includes the additional step of cooling the reaction mixture prior to said step of neutralizing.

9. A process according to claim 1, wherein said excess and neutralized amine is removed by vacuum stripping.

10. A process according to claim 1, including the additional step of diluting the polybutene amine composition with aromatic solvent sufficient to provide a basic nitrogen content of about one percent by weight.

11. A process according to claim 1 wherein the lime utilized in said neutralization step comprises at least 85% by weight calcium oxide.

12. A process according to claim 1 wherein the lime utilized in said neutralization step comprises at least 90% by weight calcium oxide.

13. A process according to claim 1 wherein at least 0.55 moles of calcium oxide is utilized for every mole of said formed amine hydrochloride.

14. A process according to claim 1 wherein said non-aqueous separation step is performed utilizing a filter.

15. A process according to claim 14 wherein said filter comprises a plate and frame type filter.

16. A process according to claim 1 wherein at least 0.65 moles of calcium oxide is utilized for every mole of said formed amine hydrochloride.

17. A process according to claim 1 wherein at least 0.85 moles of calcium oxide is utilized for every mole of said formed amine hydrochloride.

* * * * *